(12) United States Patent
Bird et al.

(10) Patent No.: US 8,881,516 B2
(45) Date of Patent: Nov. 11, 2014

(54) ONE-WAY BRAKE FOR A TORQUE CONVERTER STATOR

(75) Inventors: Norman J. Bird, Plymouth, MI (US); Dennis N. Wys, Ann Arbor, MI (US); John S. Kozar, Livonia, MI (US); Kenneth W. May, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 13/399,591

(22) Filed: Feb. 17, 2012

(65) Prior Publication Data

US 2013/0213027 A1    Aug. 22, 2013

(51) Int. Cl.
*F16D 33/00* (2006.01)

(52) U.S. Cl.
USPC ............................................... 60/345

(58) Field of Classification Search
USPC .............................................. 60/345; 192/46
See application file for complete search history.

(56) References Cited

U.S. PATENT DOCUMENTS

| | | |
|---|---|---|
| 5,853,073 A | 12/1998 | Costin |
| 5,947,245 A | 9/1999 | Costin et al. |
| 5,954,174 A | 9/1999 | Costin |
| 5,971,122 A | 10/1999 | Costin et al. |
| 6,062,362 A | 5/2000 | Costin et al. |
| 6,109,410 A | 8/2000 | Costin |
| 6,125,979 A | 10/2000 | Costin et al. |
| 6,338,403 B1 | 1/2002 | Costin et al. |
| 6,533,089 B2 | 3/2003 | Muramatsu |
| 6,557,681 B2 | 5/2003 | Kinoshita et al. |
| 6,575,275 B2 | 6/2003 | Shirataki et al. |
| 6,612,107 B2 | 9/2003 | Sato |
| 6,715,596 B2 | 4/2004 | Muramatsu et al. |
| 6,732,844 B2 | 5/2004 | Muramatsu |
| 6,739,441 B2 | 5/2004 | Muramatsu |
| 6,745,881 B1 | 6/2004 | Kremer |
| 6,749,051 B2 | 6/2004 | Muramatsu |
| 6,814,200 B2 | 11/2004 | Stefina |
| 6,823,973 B2 | 11/2004 | Muramatsu |
| 6,830,138 B2 | 12/2004 | Muramatsu |
| 6,948,228 B2 | 9/2005 | Kinoshita et al. |
| 7,000,749 B2 | 2/2006 | Yamada et al. |
| 7,101,306 B2 | 9/2006 | Blair et al. |
| 7,500,548 B2 * | 3/2009 | Kimes et al. ............... 192/46 |
| 7,661,518 B2 | 2/2010 | Kimes |
| 7,757,829 B2 | 7/2010 | Hemphill et al. |
| 8,202,198 B2 | 6/2012 | Samie et al. |
| 8,403,123 B2 | 3/2013 | Bird et al. |
| 2006/0260896 A1 | 11/2006 | Jung |
| 2010/0288592 A1 | 11/2010 | Papania et al. |

* cited by examiner

*Primary Examiner* — Michael Leslie
(74) *Attorney, Agent, or Firm* — James Dottavio; MacMillan, Sobanski & Todd, LLC

(57) ABSTRACT

A stator assembly for a torque converter includes a member fixed against rotation and including engagement surfaces spaced mutually about an axis, a stator formed with pockets spaced about the axis, rockers, each rocker located in a pocket, able to pivot toward and away from engagement with the engagement surfaces, and springs, each spring urging a rocker toward engagement with the engagement surfaces.

17 Claims, 6 Drawing Sheets

ONE-WAY BRAKE FOR A TORQUE CONVERTER STATOR

BACKGROUND OF THE INVENTION

1. Field of the Invention

This invention relates generally to a reactor assembly, and more particularly to an overrunning brake, sometimes called a one-way brake, installed in the reactor assembly of a torque converter for use in a motor vehicle.

2. Description of the Prior Art

A torque converter is a hydrodynamic drive unit that transmits rotary power and has capacity to amplify torque. A torque converter includes an impeller, stator or reactor, and turbine, all of which are bladed wheels, enclosed within a toroidal cover filled with hydraulic fluid, such as automatic transmission fluid. The stator, located in a fluid path between the exit of the turbine and the inlet of the impeller, redirects fluid onto the impeller, thereby amplifying torque. When the torque converter overruns, it functions as a fluid coupling without amplifying torque.

When used in an automatic transmission for a vehicle, a torque converter includes a one-way brake (OWB) to react torque in the reactor during torque multiplication while the vehicle is accelerating at low speed. The OWB allows the reactor to spin freely, i.e., to overrun, when the vehicle is at constant speed and coasting. Allowing the reactor to spin freely while coasting reduces drag.

A conventional OWB includes at least three major components: steel outer and inner races, and locking elements, which are rollers or sprags located in an annular space between the races. The inner race transfers torque though splines onto a stator shaft, which is fixed against rotation. The outer race is pressed into the reactor, which is usually formed of aluminum or plastic.

The steel of the races and locking elements is of high grade due to the large magnitude of material stresses produced during operation. The races also required numerous machining operations, including drilling lubrication holes, rough and finish turning (generally all surfaces are turned), grinding and polishing for finish and tolerance, and broaching. The number of parts of a conventional roller or sprag OWB further increases their cost and complexity of manufacture.

SUMMARY OF THE INVENTION

A stator assembly for a torque converter includes a member fixed against rotation and including engagement surfaces spaced mutually about an axis, a stator formed with pockets spaced about the axis, rockers, each rocker located in a pocket, able to pivot toward and away from engagement with the engagement surfaces, and springs, each spring urging a rocker toward engagement with the engagement surfaces.

The one-way brake has a low number of parts, thereby requiring less processing, fewer assembly steps, and lower cost of manufacture and assembly. The rocker's large area of contact on the aluminum stator, proper angle of attack and rocker shaft length allow installing the OWB locking elements directly into the reactor.

The material properties of the stator shaft permit its use as the cam for the OWB, and a pilot for guiding the stator into place in the assembly.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
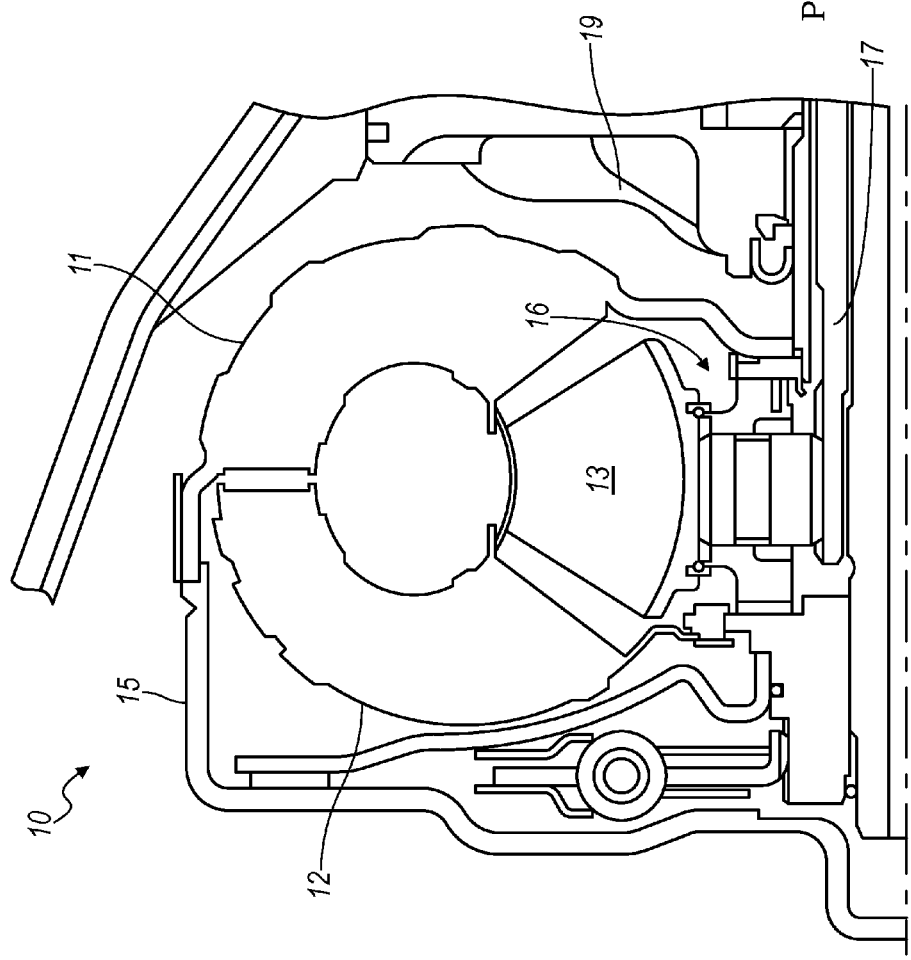
FIG. 1 is a schematic diagram of a torque converter.

Referring to FIG. 1, a torque converter 10 includes an impeller 11, turbine 12, and stator 13 or reactor, and, all of which are bladed wheels, enclosed within a toroidal cover 15 filled with hydraulic automatic transmission fluid. The blades of the stator 13, which is located in a fluid flow path between the exit of the 12 turbine and the inlet of the impeller 11, redirect fluid onto the impeller. The stator 13 is supported on a one-way brake 16, which is mounted on a stator shaft 17, which is held against rotation, usually by being fixed to a transmission pump housing 19.

Figure 2:
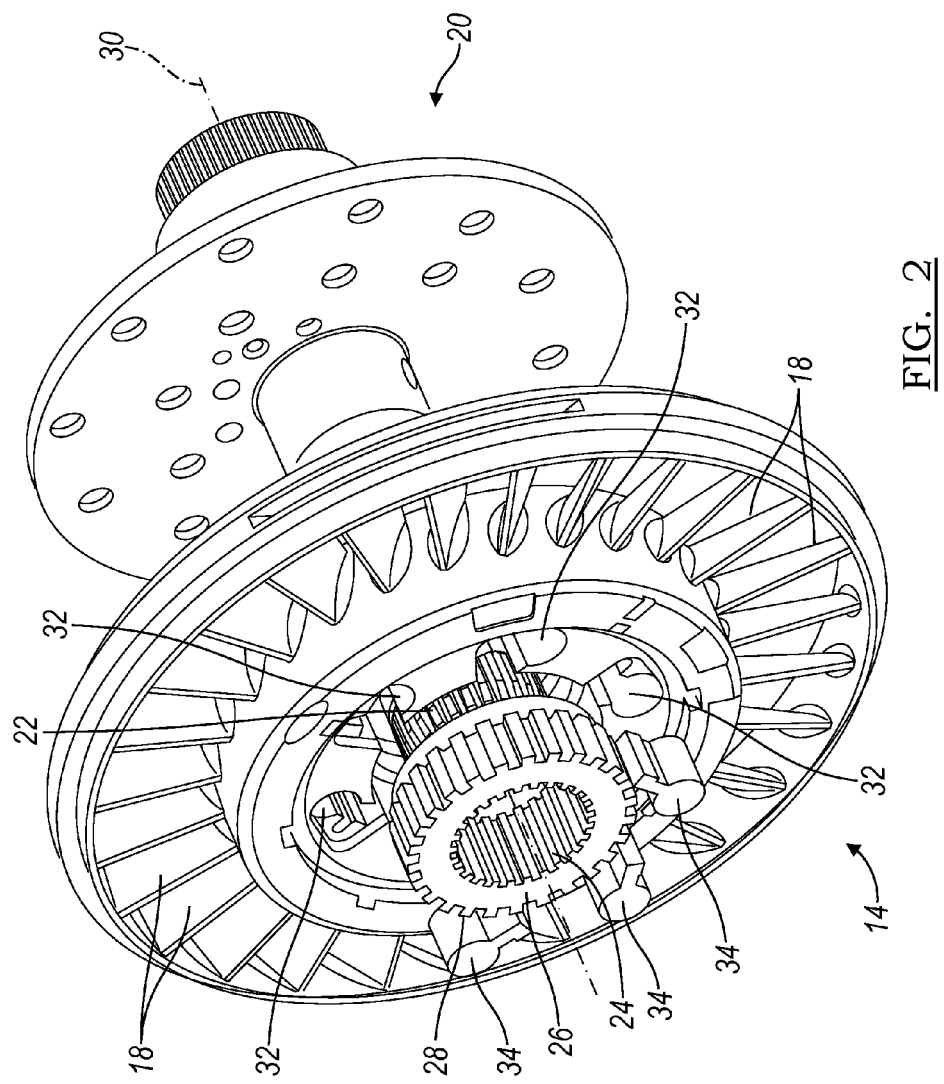
FIG. 2 is a perspective side view showing a stator, one-way clutch and stator shaft in spaced relationship.

As FIG. 2 shows, a stator shaft 20 is formed with external spine teeth 22, which engage internal spline teeth 24 formed on a race 26 of a one-way brake, which is sometimes referred to as an overrunning brake. The outer surface of race 26 is formed with cams 28, which are spaced angularly about axis 30.

The stator 14 is formed with blades 18 spaced mutually angularly about axis 30. The stator 14 is further includes a hub, located radially inboard of the blades and in which pockets 32, spaced angularly about the axis, are formed. Each pocket 32 contains a rocker 34, sometimes called a strut, and a spring 36, which continually urges a respective rocker to pivot in its pocket toward engagement with the cams 28.

Figure 3:
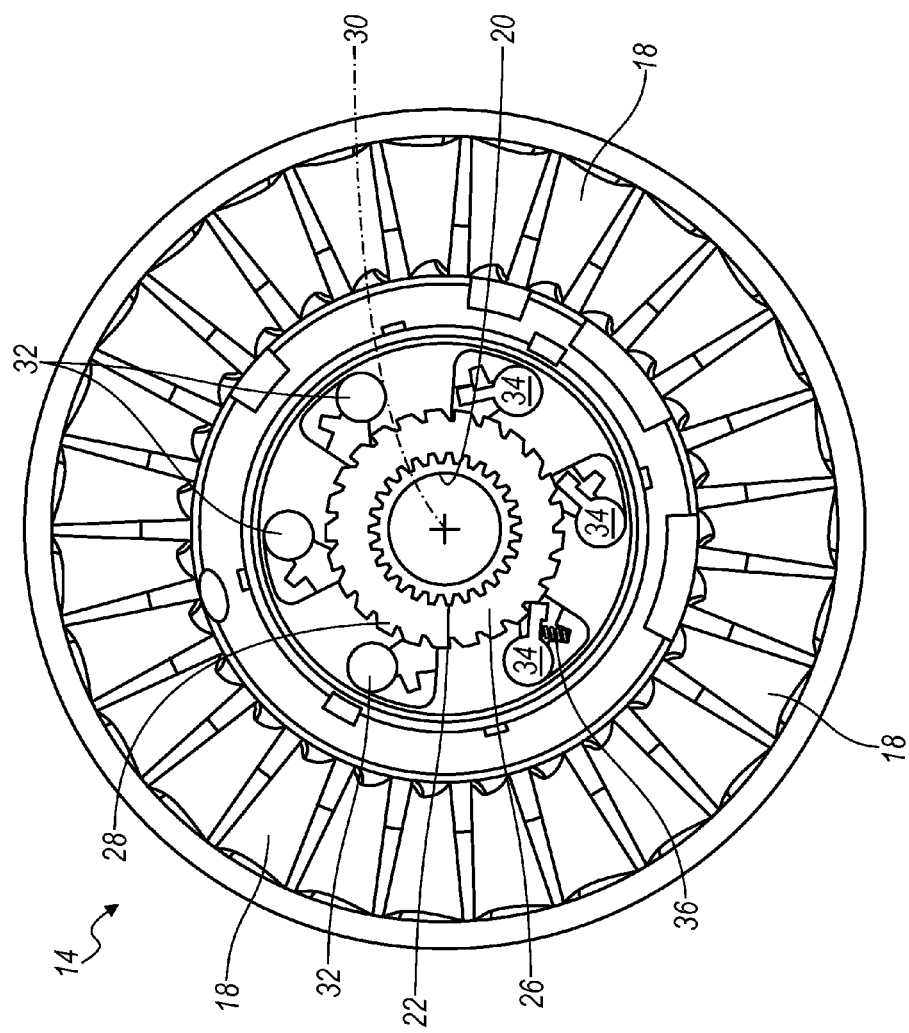
FIG. 3 is a front view of the stator-stator shaft assembly of FIG. 2.

FIG. 3 shows three of the six pockets 32 containing a rocker 34, and one of the pockets 32 also containing a coiled helical compression spring 36. Preferably each pocket 32 contains a rocker 34 and a spring 36.

In FIG. 3, the rocker 34 at the left-hand side is shown in the locked position, i.e., engaged with one of the cams 28, due to the force of its respective spring 36 with one of the cams 28 such that the stator 14 is fixed to the stator shaft 20 and race 26, thereby preventing counterclockwise rotation of the stator relative to the stator shaft and race.

The middle rocker 34 in shown in the ratcheting position, in which the force of spring 36 holds the rocker in contact with the cams 28 as the stator 14 rotates clockwise relative to stator shaft 20 and race 26 at low speeds up to about 1000 rpm.

The middle rocker in shown in the ratcheting position, in which the force of spring 36 holds the rocker in contact with the cams 28 as the stator 14 rotates clockwise relative to stator shaft 20 and race 26 at low speeds up to about 1000 rpm.

The rocker 34 at the right-hand side is shown located entirely within its pocket 32, due to centrifugal force on the rocker having pivoted the rocker out of contact with the cams 28 in opposition to the force of its spring 36, the stator 14 rotating faster than about 1000 rpm.

Figure 4:
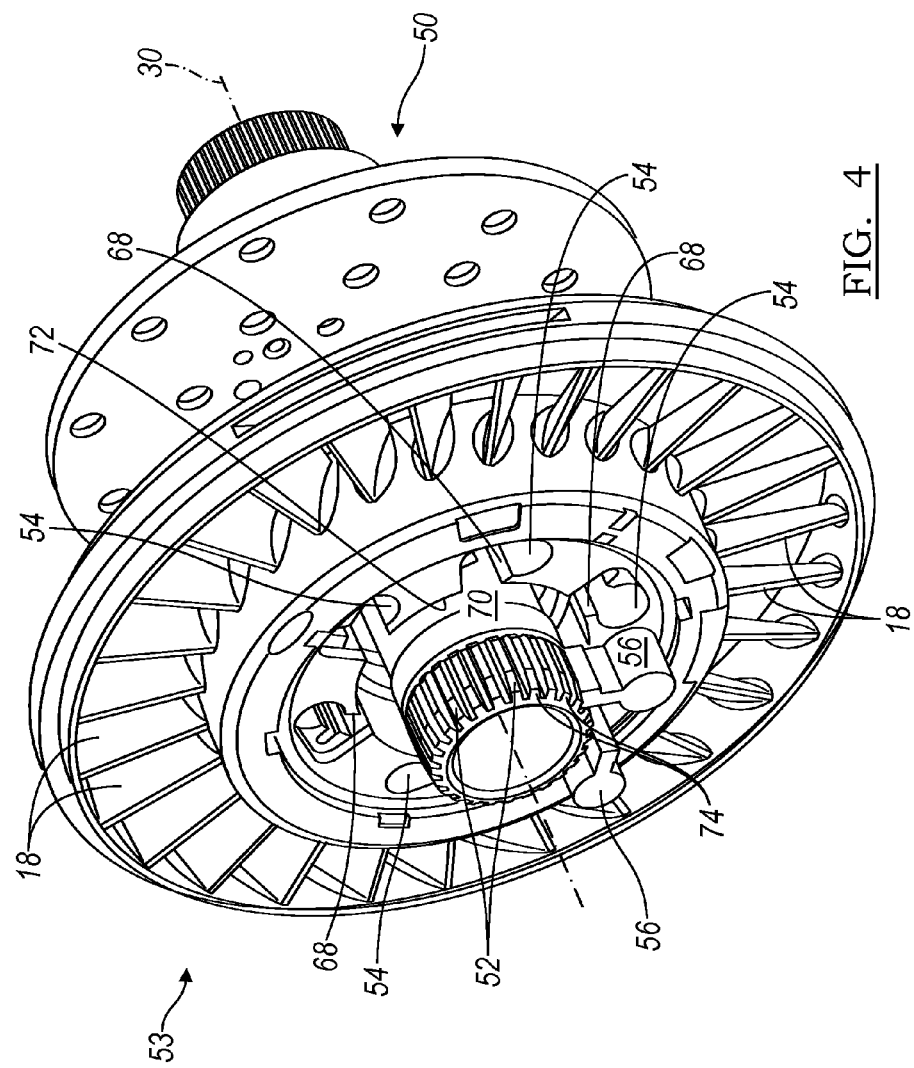
FIG. 4 is a perspective side view showing a stator, one-way clutch and stator shaft in spaced relationship.

As FIG. 4 shows, a stator shaft 50 is formed with external cam teeth 52, which are fitted within an annular space of a stator 53. The hub of stator 53 is formed with pockets 54, spaced mutually angularly about axis 30. Each pocket 54 contains a rocker 56 and a coiled helical compression spring 58, located in the pocket similarly to spring 36. The spring 58 continually urges a respective rocker 56 to pivot in its pocket toward engagement with the cam teeth 52. The cam teeth 52 are preferably shaped such that they conform to the shape of the cams 28 of the race 26 shown in FIGS. 2 and 6, or they may have the shape and contour of conventional axial spline teeth, as shown in FIG. 4.

Figure 5:
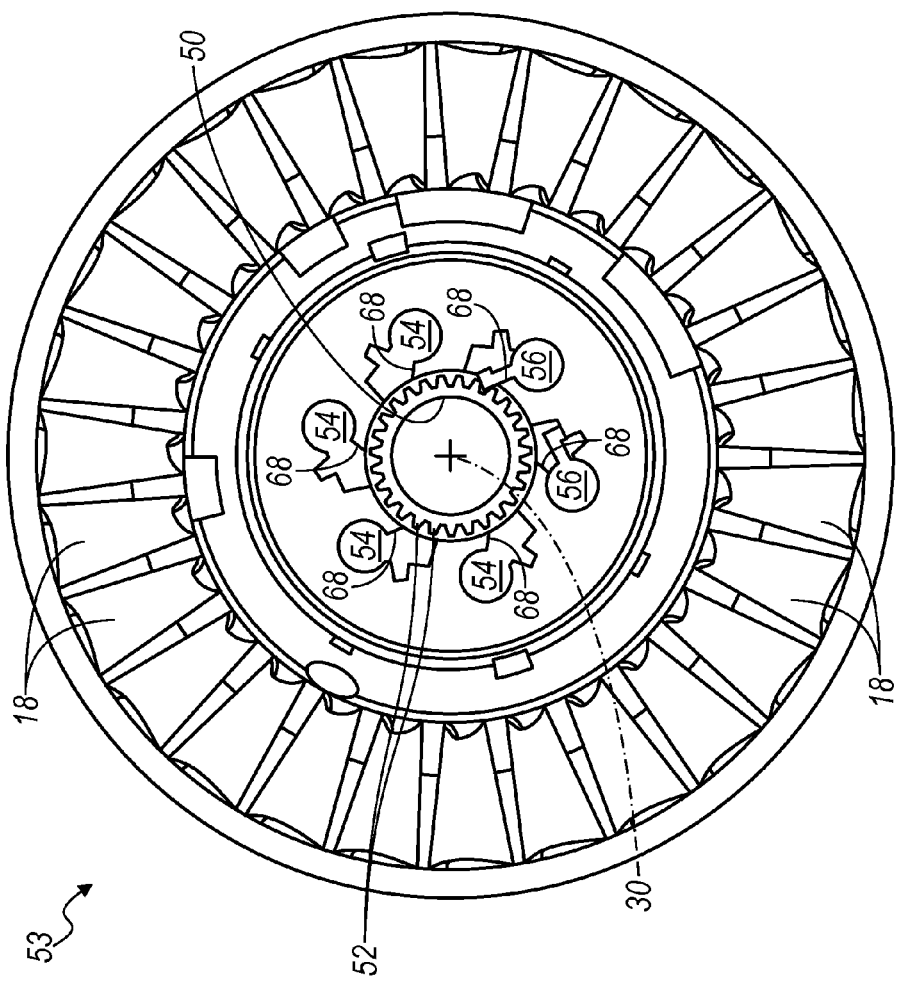
FIG. 5 is a front view of the stator-stator shaft assembly of FIG. 4.

FIG. 5 shows two of the six pockets 54 containing a rocker 56, and one of the pockets 54 also containing a spring 58. Preferably each pocket 54 contains a rocker 56 and a spring 58.

In FIG. 5, the rocker 56 at the right-hand side is shown in the locked position, i.e., engaged with one of the cam teeth 52, due to the force of its respective spring 58 such that the stator 53 is fixed to the stator shaft 50, thereby preventing counterclockwise rotation of the stator 53 relative to the stator shaft 50. The rocker 56 at the left-hand side is shown located entirely within its pocket 54, due to centrifugal force on the rocker having pivoted the rocker clockwise out of contact with the cams 52 in opposition to the force of its spring 58, the stator 53 rotating faster than about 1000 rpm.

Preferably the stator 14, 54 is of formed of cast aluminum alloy, and the circular cylindrical shape of the circular portion of each pocket 32, 54 is formed when the stator is cast. Thereafter, a skim drill operation permits that portion of the pocket 32, 54 and the corresponding portion of the rocker 34, 56 to be fitted mutually to a close tolerance. Preferably each pocket 32, 54 is blind, i.e., having an open end at the axial side away from the stator shaft 20, 50 and a closed end at the axial side adjacent the stator shaft.

Preferably each rocker 36, 56 is formed of sintered powered metal. Stator shaft 20 and race 26 are of heat treated steel.

Figure 6:
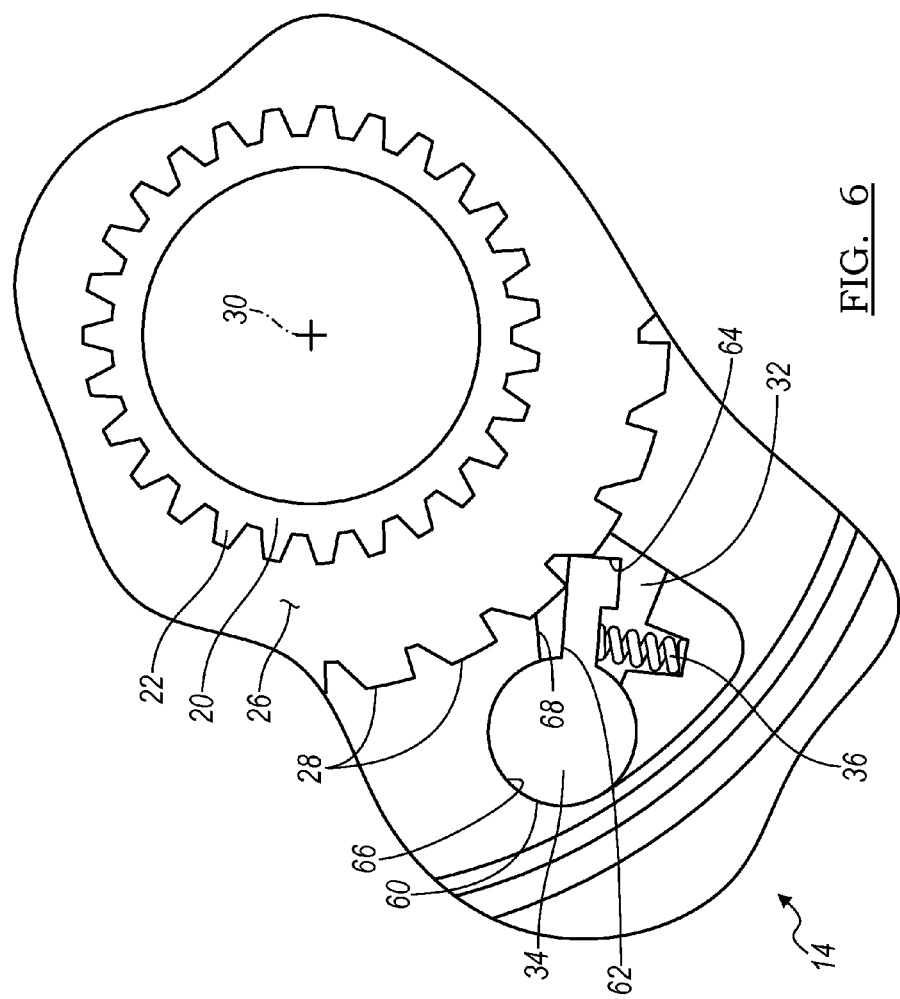
FIG. 6 is a front view of a portion of the stator-stator shaft assembly of FIG. 2.

FIG. 6 shows that each rocker 34, 56 is formed with a convex circular cylindrical base 60, a rectangular shaft portion 62, and a rectangular engagement portion 64, which contacts the cams 28. Each pocket 32, 54 includes a concave circular cylindrical surface 66 at least partially formed when the stator 14, 54 is cast. The convex circular cylindrical base 60 of a rocker 34, 56 is inserted in the concave circular cylindrical surface 66 of a pocket 32, 54. The circular cylindrical shapes maximize the surface area of the aluminum pocket 32, 54, thereby significantly reducing the contact pressure between the rocker's base 60 and the pocket's surface 66. Thus, the surface contact between the convex circular cylindrical base 60 and the concave circular cylindrical surface 66 may be an angle greater than 180 degrees and may be greater than 270 degrees, as is shown in the contact between these surfaces in FIGS. 3, 5 and 6.

In the embodiment of FIGS. 4 and 5 without the stator being installed on the stator shaft 50, counterclockwise pivoting movement of the rockers 56 toward axis 30 due to the force of springs 58 is limited by each rocker contacting a stop surface 68 formed in the pocket opposite the location of the spring 58. In the embodiment of FIGS. 2, 3 and 6, stop surfaces 68 to limit counterclockwise pivoting movement of the rockers 34 toward axis 30 due to the force of springs 36 can be used, but they are not essential.

In the embodiment of FIGS. 4 and 5, FIG. 4 shows that stator shaft 50 includes a circular cylindrical surface 70 having a larger outside diameter than that of the cam teeth 52. When the torque converter is being installed on the stator shaft 50 or removed from the stator shaft, surface 70 pilots the inner cylindrical surface 72 of stator 53, thereby guiding the stator and torque converter as they move axially along the stator shaft.

In the embodiment of FIGS. 4 and 5, to facilitate installation of the torque converter on the stator shaft 50, the axial end of the stator shaft is not located in a radial plane. Instead it is formed with beveled chamfer surfaces 74, which extend angularly around the end of the stator shaft and radially outward onto the end of each cam tooth 52. The beveled surfaces 74 are inclined radially outward from axis 30 and axially along a short portion of the length of the stator shaft. When the torque converter is being installed, the rockers 56 are located in their respective pockets 54, and springs 58 force the rockers to pivot radially inward into contact with the stop surface 68 of the pockets 54. The axial ends of the rockers that extend radially inward past the stator 53 opening contact the bevel surfaces 74 as the stator 53 moves axially along the stator shaft 50.

In the embodiment of FIGS. 2, 3 and 6, beveled chamfer surfaces, similar to surfaces 74, may be formed on the end of race 26 and cams 28, but they are not essential.

In accordance with the provisions of the patent statutes, the preferred embodiment has been described. However, it should be noted that the alternate embodiments can be practiced otherwise than as specifically illustrated and described.

The invention claimed is:

1. An assembly for a torque converter, comprising:
a shaft fixed against rotation, secured to a nonrotating housing, and including engagement surfaces spaced mutually about an axis;
a stator formed with pockets including a concave circular cylindrical surface;
rockers, each rocker located in one of the pockets, including a convex circular cylindrical base for contacting one of said concave surfaces;
springs, each spring urging one of the rockers to pivot toward the engagement surfaces.

2. The assembly of claim 1, wherein each spring is located in a pocket.

3. The assembly of claim 1, wherein the stator includes:
a hub in which the pockets are formed; and
blades located radially outward relative to the axis from a radial location of the pockets.

4. The assembly of claim 1, wherein the stator includes:
a hub in which the pockets are formed; and
blades located radially outward relative to the axis from a radial location of the pockets, with the blades rotationally fixed to the hub.

5. The assembly of claim 1, wherein:
each rocker includes an engagement portion for contacting the engagement surfaces, and a shaft portion extending between the base and the engagement portion, one of the springs contacting the shaft portion.

6. An assembly for a torque converter, comprising:
a stator having blades rotationally fixed to a hub having pockets including a concave circular cylindrical surface;
a race fixed against rotation and including engagement surfaces spaced mutually about an axis;
rockers, each rocker located in one of the pockets, including a convex circular cylindrical base for contacting one of said concave surfaces;
springs, each spring urging one of the rockers toward engagement with the engagement surfaces.

7. The assembly of claim 6, wherein each spring is located in a pocket.

8. The assembly of claim 6, further comprising:
a shaft fixed against rotation, secured to the race, and secured to a nonrotating housing.

9. The assembly of claim 6, wherein:
contact between the convex circular cylindrical base of one of the rockers and the concave circular cylindrical base of one of the pockets extends through an angle that is greater than one hundred eighty degrees.

10. The assembly of claim 6, wherein:
each rocker includes an engagement portion for contacting the engagement surfaces, and a shaft portion extending between the base and the engagement portion, one of the springs contacting the shaft portion.

11. A stator assembly for a torque converter, comprising:
a shaft held against rotation;
engagement surfaces spaced mutually about an axis and driveably connected to the shaft;
a stator formed with pockets, each pocket including a concave cylindrical surface;
rockers, each rocker located in one of the pockets, including a convex cylindrical base for contacting one of said concave surfaces;
springs, each spring urging one of the rockers toward the engagement surfaces; and
wherein contact between the convex cylindrical base of one of the rockers and the concave cylindrical surface of a corresponding pocket extends through an angle greater than one hundred eighty degrees.

12. The stator assembly of claim 11, further comprising a race fixed to the shaft and including the engagement surfaces.

13. The assembly of claim 11, wherein each spring is located in a pocket.

14. The assembly of claim 11, wherein the stator further includes:
a hub in which the pockets are formed; and
blades located radially outward relative to the axis from a radial location of the pockets.

15. The assembly of claim 11, wherein the stator further includes:
a hub in which the pockets are formed; and
blades located radially outward relative to the axis from a radial location of the pockets, with the blades rotationally fixed to the hub.

16. The assembly of claim 11, wherein:
each rocker includes an engagement portion for contacting the engagement surfaces, and a shaft portion extending between the base and the engagement portion, one of the springs contacting the shaft portion.

17. The assembly of claim 11, wherein each spring is a helical compression spring located in a pocket and contacting a rocker.

* * * * *